US010604250B2

(12) United States Patent
Fenison

(10) Patent No.: US 10,604,250 B2
(45) Date of Patent: Mar. 31, 2020

(54) HANG GLIDER CONTROL DEVICE

(71) Applicant: Burton James Fenison, Morton, WA (US)

(72) Inventor: Burton James Fenison, Morton, WA (US)

( * ) Notice: Subject to any disclaimer, the term of this patent is extended or adjusted under 35 U.S.C. 154(b) by 311 days.

(21) Appl. No.: 15/722,088

(22) Filed: Oct. 2, 2017

(65) Prior Publication Data

US 2018/0093767 A1 Apr. 5, 2018

Related U.S. Application Data

(60) Provisional application No. 62/404,466, filed on Oct. 5, 2016.

(51) Int. Cl.
*B64C 31/028* (2006.01)
*B64C 31/032* (2006.01)

(52) U.S. Cl.
CPC ........ *B64C 31/0285* (2013.01); *B64C 31/028* (2013.01); *B64C 31/032* (2013.01)

(58) Field of Classification Search
CPC .. B64C 31/0285; B64C 31/032; B64C 31/028
See application file for complete search history.

(56) References Cited

U.S. PATENT DOCUMENTS

| | | | |
|---|---|---|---|
| 4,773,619 A | 9/1988 | Rubik | |
| 4,875,642 A * | 10/1989 | Flynn | B64C 31/024 244/13 |
| 5,078,335 A * | 1/1992 | David | B60F 5/02 244/2 |
| 5,915,650 A * | 6/1999 | Petrovich | B64C 3/38 244/46 |
| 6,530,540 B1 * | 3/2003 | Chen | B64C 33/00 244/11 |
| 7,698,967 B2 | 4/2010 | Ording et al. | |
| 8,561,936 B2 * | 10/2013 | Matte | B64C 31/032 244/16 |

* cited by examiner

*Primary Examiner* — Valentina Xavier
(74) *Attorney, Agent, or Firm* — Patentfile, LLC; Bradley C. Fach; Steven R. Kick

(57) ABSTRACT

A hang glider control device may include a cross bar having a first end, a second end, a central region, a first central arm, and a second central arm. The first central arm and the second central arm may be coupled oppositely to the central region. The first end may be formed by a portion of the first central arm distal to the central region, and the second end may be formed by a portion of the second central arm distal to the central region. The first end of the cross bar may be configured to couple the cross bar to the first upright above the base tube, and the second end of the cross bar may be configured to couple the cross bar to the second upright above the base tube so that the crossbar may be generally parallel to the base tube.

20 Claims, 8 Drawing Sheets

HANG GLIDER CONTROL DEVICE

CROSS REFERENCE TO RELATED APPLICATIONS

This application claims priority to and the benefit of the filing date of U.S. Provisional Application No. 62/404,466, filed on Oct. 5, 2016, entitled "Fension Fly Bar or Suprone Bar", which is hereby incorporated by reference in its entirety.

FIELD OF THE INVENTION

This patent specification relates to the field of devices for controlling the flight of hang gliders and other ultralight aircraft. More specifically, this patent specification relates to devices for facilitating the control of hang gliders and other ultralight aircraft by a pilot in a foot forward position such as the suprone position.

BACKGROUND

Hang Gliders, ultralight aircraft, and other pilot weight shifted aircraft, in the late 60's and early 70's, started out flying their craft in the seated position which is a foot forward position. In the early to mid 70's the head first flying position called the prone position became prominent mainly due to the increase of control available flying in the prone position. Unfortunately, as noted by medical journals published in southern California, this switch from a foot first position (seated, supine, and suprone are all feet forward positions) to a head first position (prone) coincided with an increase in serious injuries to pilots.

The suprone position in hang gliding circles is defined as the pilot positioned above the base tube of the A-frame or triangular control frame, flying feet forward, so that the pilot's entire body can move freely in and out of the A-frame of the glider. This has traditionally been done by the pilot placing hands directly on the uprights of the A-frame which has provided a limited range of speed, comfort, and control that can be acquired due to ergonomic considerations.

The traditional suprone pilot flying cannot fully recline and remain within easy reach of the gliders A-frame or control bar. Reclining into the streamlined position places the uprights beyond a pilot's easy reach causing suprone pilots to often resort to remaining hunched forward to grasp the uprights for control, or if fully reclined in the streamlined position, resort to using the aircrafts rear flying wires for weight shift control movements but the rear flying wires of the aircraft were not designed to be used in this manner and do not provide a solid connection with the frame of the aircraft to perform control functions.

All this leaves a suprone pilot flying a hang glider or ultralight with less control over the aircraft compared to other flying positions, such as the prone position, which is the head first position.

Less control, limited speed range, and lack of comfort are the primary reasons suprone flight has never gained in popularity even though the suprone pilots body positioned feet first within the safety of the A-frame with the base tube of the A-frame directly beneath the pilot's body provides tremendous potential for surviving an impact.

There are three other flying positions historically and currently used to pilot a weight shifted aircraft. I will list them in order of current popularity. The positions are prone, supine and seated in addition to the suprone position described earlier, with suprone currently the least popular.

In the prone position, a pilot is flying head first like superman, above the base tube which the prone pilot grasps to control the aircraft by shifting his/her weight. The main problem with the prone position is there is nothing to restrict the pilot from swinging forward and upward in the event of a rapid deceleration of the aircraft. This has resulted in numerous upper body injuries and death.

In the supine position the pilot is flying feet first, semi-reclined, with the pilot's legs extended forward and below the base tube. Flying a hang glider in the supine position the pilot's lower extremities are below with the base tube of the A-frame with no crash protection beneath the pilot's body. Another problem with flying in the supine position is it is not convenient to do what pilots call a "hang check" before launching.

A "hang check" is where a helper holds the nose of the glider at the flying angle of attack while the pilot "hangs" in his or her harness to ensure all is well before committing to launch. Those are the two primary problems flying in the supine.

Flying a hang glider in the "seated" position, as commonly defined in hang gliding community, is the pilot remains fairly erect, legs hanging downward and rear of the A-frame, with the base tube of the A-frame in front of the pilot and somewhat level with the pilot's waistline. The main problems with the seated position are the same as in the supine position. No protection for the pilot's lower extremities, limited ability to pull in for speed, inconvenient to perform a "hang check", and high wind resistance during flight which decreases the aircrafts performance.

Therefore, a need exists for devices which are able to address and solve the safety, control, and comfort issues faced by hang glider and ultralight pilots who seek to pilot their aircraft in the foot forward specifically known as the suprone position which has the potential to be the most comfortable and most survivable position in which to fly such aircraft. A further need exists for novel devices which enable a suprone pilot to fully recline and remain within easy reach of the A-frame or control bar of an ultra light aircraft.

BRIEF SUMMARY OF THE INVENTION

A hang glider control device is provided. The device may be for use with a hang glider having an A-frame or triangular shaped control frame which may include a first upright and a second upright which may each be coupled to a base tube to from a generally triangular shape.

In some embodiments, the device may include a cross bar having a first end, a second end, a central region, a first central arm, and a second central arm. The first central arm and the second central arm may be coupled opposingly to the central region. The first end may be formed by a portion of the first central arm distal to the central region, and the second end may be formed by a portion of the second central arm distal to the central region. The first end of the cross bar may be configured to couple the cross bar to the first upright above the base tube, and the second end of the cross bar may be configured to couple the cross bar to the second upright above the base tube so that the crossbar may be generally parallel to the base tube.

In some embodiments, the device may include a cross bar having a first end and a second end. A first handle bar may be coupled to the first end of the cross bar, and the first handle bar may extend generally perpendicular to the cross bar. A second handle bar may be coupled to the second end of the cross bar, and the second handle bar may extend generally perpendicular to the cross bar in the same direction as the first handle bar so that the first handle bar and second handle bar may be generally parallel to each other. A first upright fastener may be coupled to the first handle bar, and the first upright fastener may be configured to couple the first handle bar to a first upright of a hang glider or ultra light aircraft. A second upright fastener may be coupled to the second handle bar, and the second upright fastener may be configured to couple the second handle bar to a second upright of the hang glider or ultra light aircraft.

In further embodiments, a hang glider control device may include a control frame having a first upright, a second upright, and a base tube which may be coupled in a generally triangular orientation. The device may further include a cross bar having a first end and a second end. A first handle bar may be coupled to the first end of the cross bar, and the first handle bar may extend generally perpendicular to the cross bar. A second handle bar may be coupled to the second end of the cross bar, and the second handle bar may also extend generally perpendicular to the cross bar in the same direction as the first handle bar so that the first handle bar and second handle bar are generally parallel to each other. A first upright fastener may couple the first handle bar to the first upright, and a second upright fastener may couple the second handle bar to the second upright.

According to another aspect, the device provides the unexpected benefit that the main support straps of a typical suprone harness, which are always forward of the pilot due to center of gravity considerations, will come into first contact with the forward center portion of the cross bar to absorb initial impact into the harness itself before the pilot's body. A tremendous safety bonus.

It is an object of the invention to enable increased control, safety, and comfort flying suprone in a hang glider or ultra light rigged to be flown in the prone position as 99% of modern hang gliders today are rigged. A glider rigged to be flown in the prone position typically has the triangular A-Frame control bar raked several degree's forward of perpendicular with the keel of the glider and works perfectly with device.

It is a further object of the invention to provide a firm object forward of the pilot from which to pull in from for speed and safety in an ergonomically strong manner.

It is a further object of the invention to provide a solid object along each side of the pilot that is never out of reach for the pilot to grasp and initiate solid roll, pitch, and yaw input to the aircraft.

It is a further object of the invention to provide some crash protection previously unavailable by limiting the forward swing of the pilot's body during a rapid deceleration of the aircraft.

It is a further object of the invention to be used to fly suprone in a hang glider or ultra light rigged for the prone position requiring no alterations to the certified configuration of the aircraft rigged for prone flight. This functionally shaped bar instantly converts an aircraft rigged for prone flight to be suitable for suprone flight.

It is a further object of the invention to provide an object within easy reach of the semi-reclined suprone pilot to quickly grasp and pull in from to lower the angle of attack of a weight shifted aircraft and gain speed required for safety in an ergonomically strong manner. The rearward extensions of the invention keep all roll and pitch control within easy reach of a fully reclined suprone pilot. The feet first suprone position is comfortable and greatly reduces both fatigue and the risk of head and neck injuries prone pilots suffer from.

It is a further object of the invention to provide an obstacle to prevent the pilots body from swinging forward and upward in the event of a crash and provides a limit as to how far a pilot can pull his/her weight forward which might prevent a pilot from exceeding the placarded limits set by the aircraft manufacturers.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
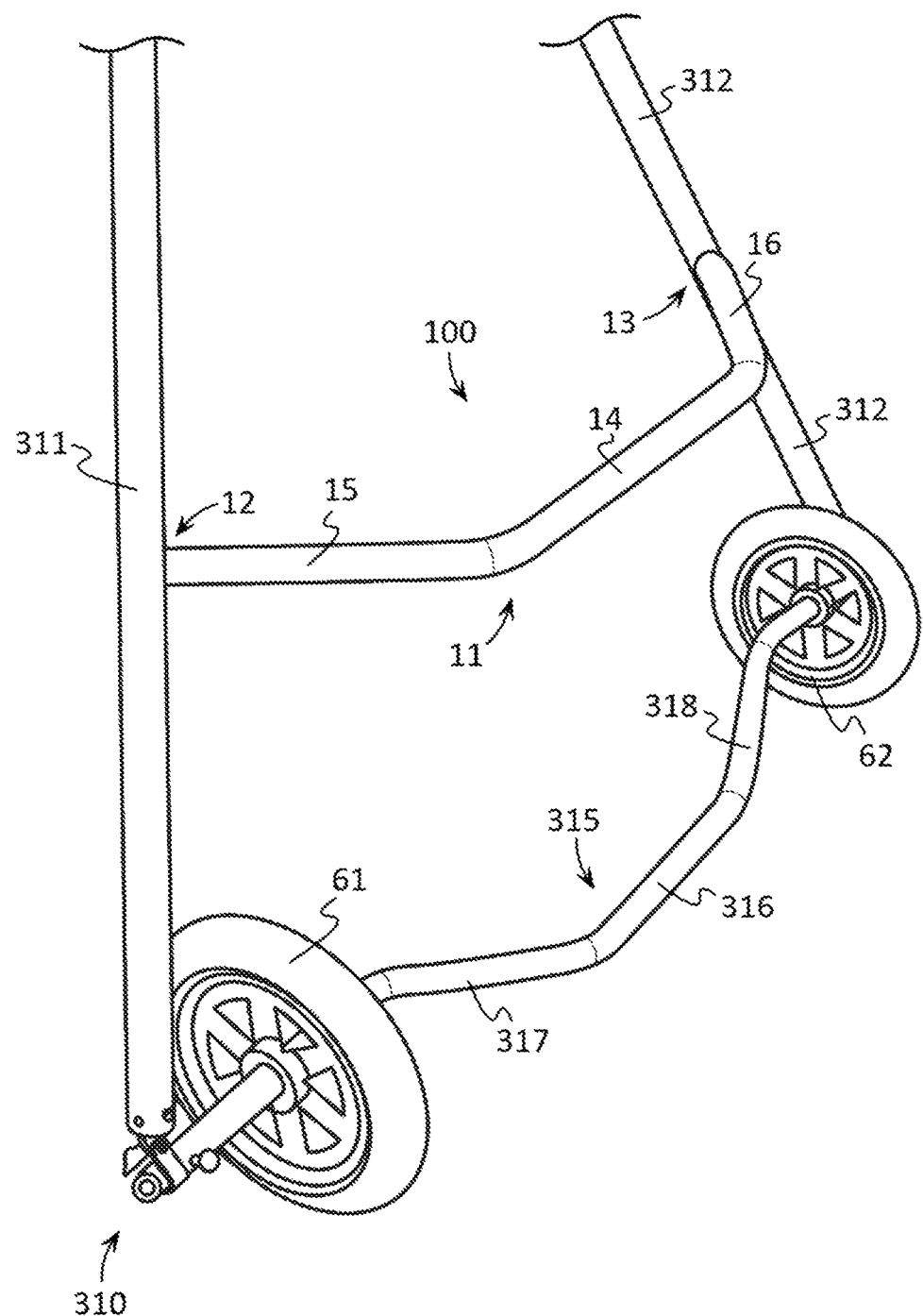
FIG. 1 depicts a perspective view of an example of a hang glider control device coupled to an A-frame or triangular control frame of an ultra light aircraft according to various embodiments described herein.
Figure 2:
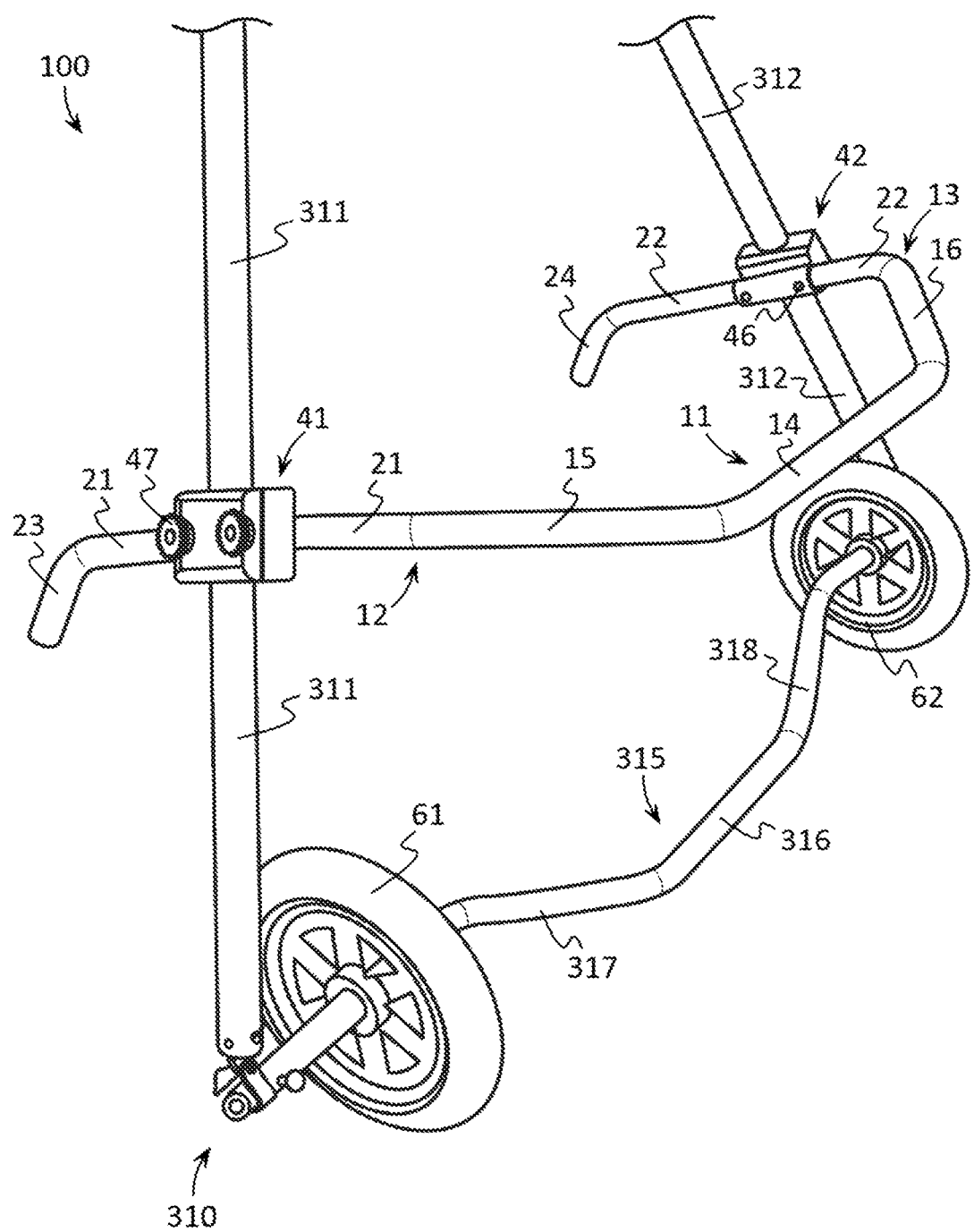
FIG. 2 illustrates a perspective view of another example of a hang glider control device coupled to an A-frame or triangular control frame of an ultra light aircraft according to various embodiments described herein.
Figure 3:
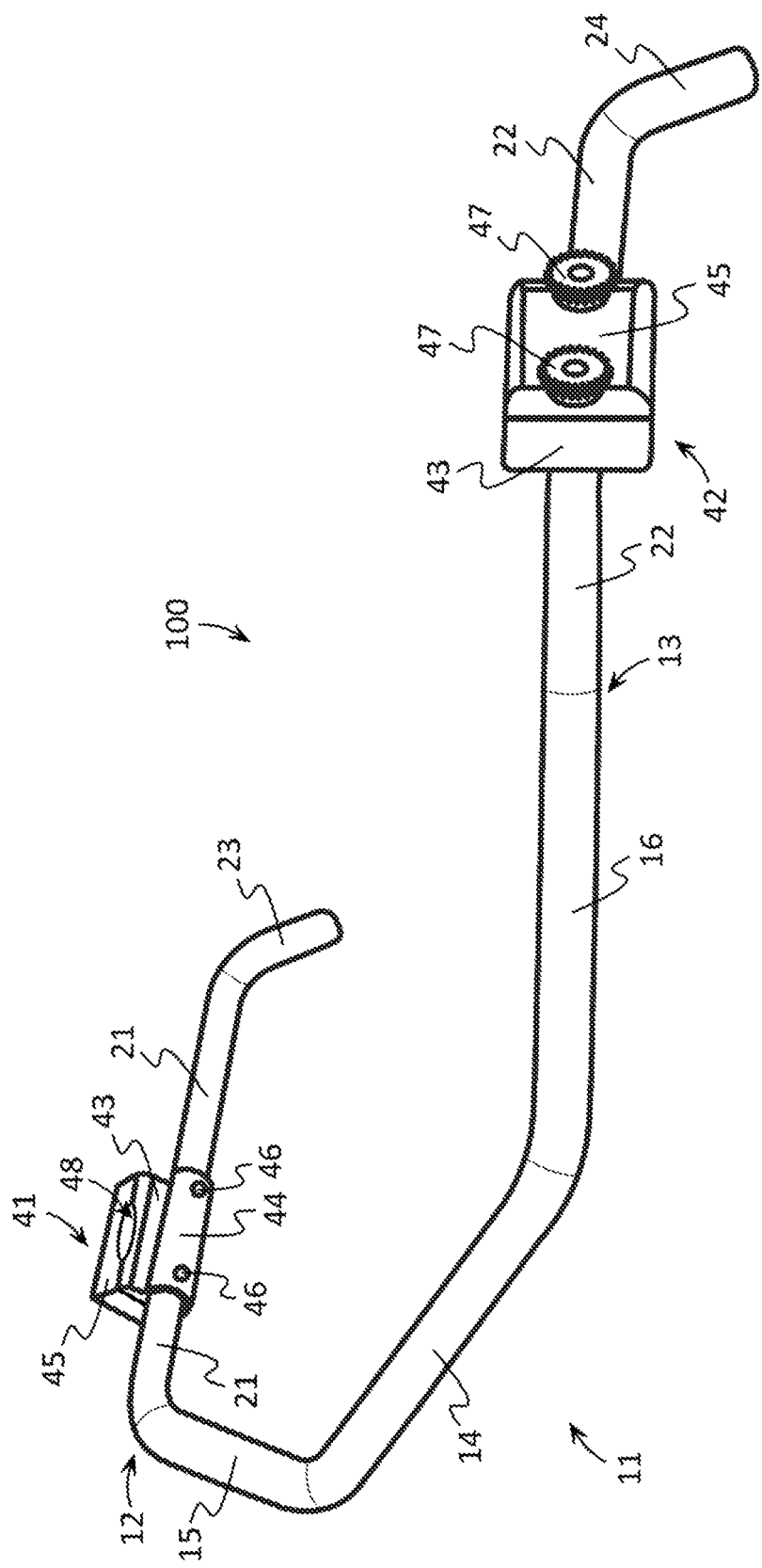
FIG. 3 shows a perspective view of a further example of a hang glider control device according to various embodiments described herein.
Figure 4:
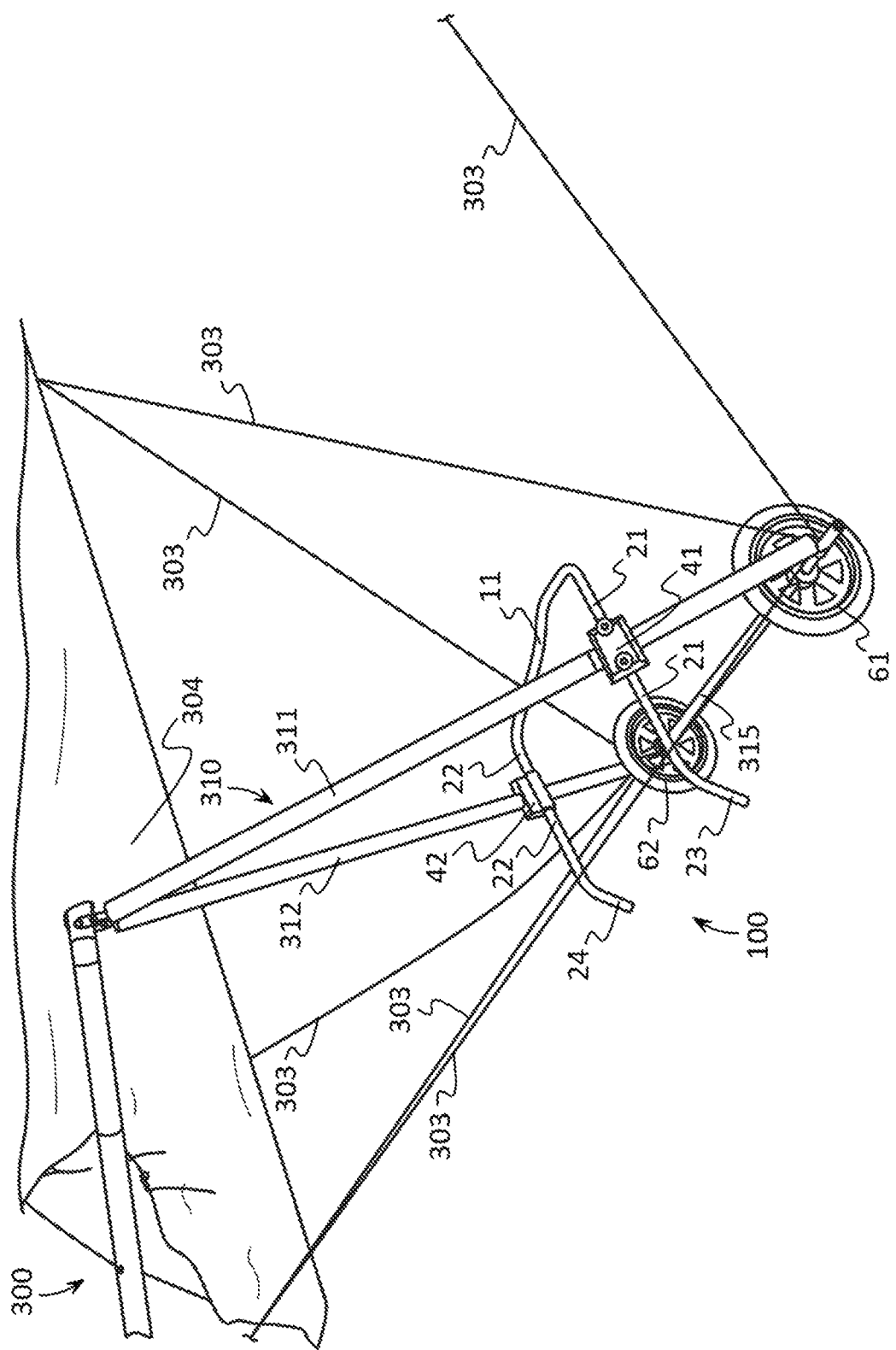
FIG. 4 depicts a perspective view of an example of a hang glider control device coupled to an A-frame or triangular control frame of an ultra light aircraft according to various embodiments described herein.
Figure 5:
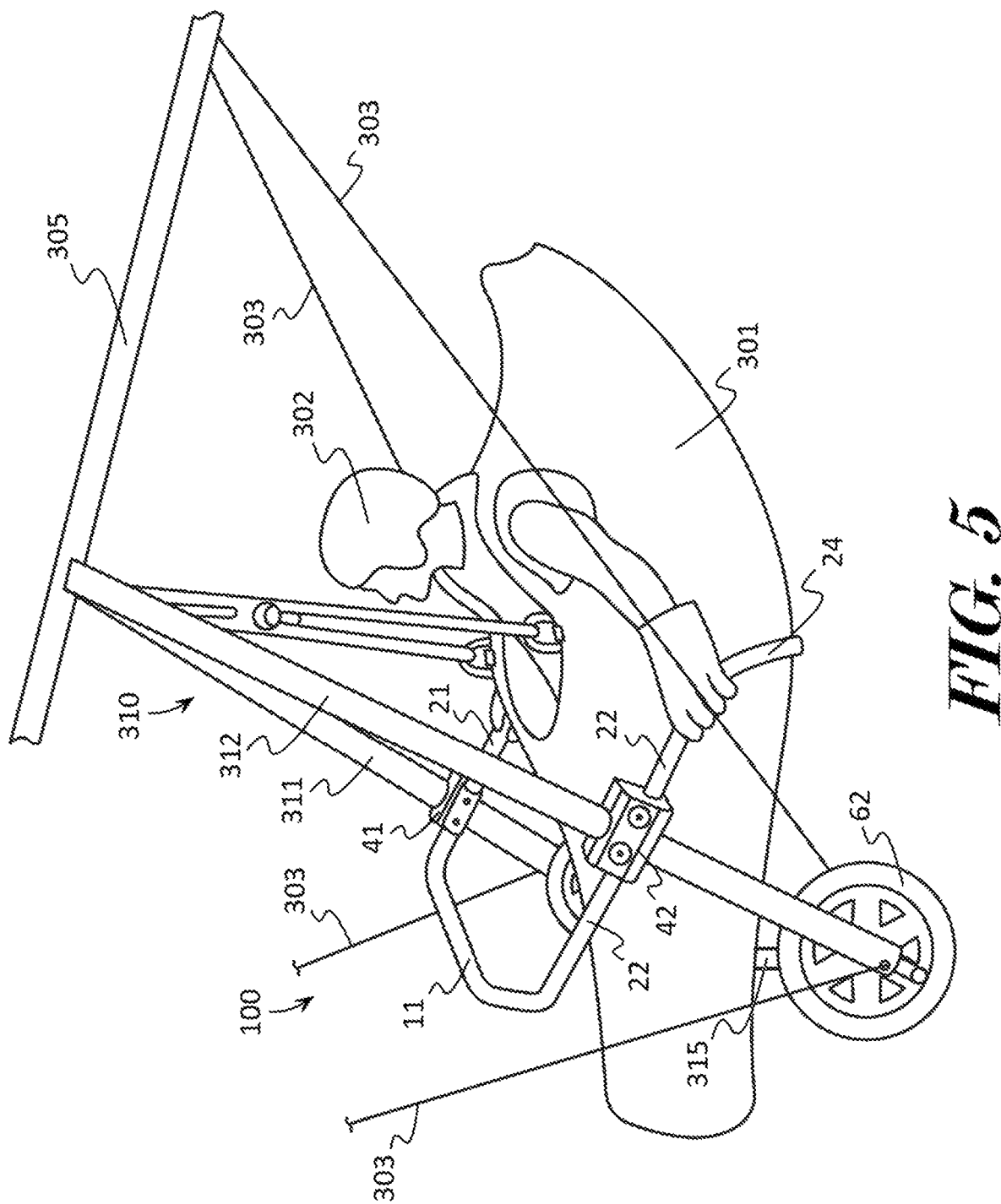
FIG. 5 illustrates a perspective view of an example of a hang glider control device coupled to an A-frame or triangular control frame of an ultra light aircraft being used by a pilot according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

New devices for controlling the flight of hang gliders are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 1-5, and 7 illustrate examples of a hang glider control device ("the device") 100 according to various embodiments. Preferably, the device 100 may be for use with a hang glider 300 or other type of ultra light aircraft having an A-frame or triangular shaped control frame 310 which may include a first upright 311 and a second upright 312. The hang glider 300 may comprise a harness 301 for a pilot 302 and rigging 303 which may be used to structurally reinforce the elements of the hang glider 300 such as the sail 304 and keel 305. A base tube 315 may be coupled to the first upright 311 and second upright 312 to from a generally triangular shape. In preferred embodiments, the device 100 may not be a structural necessity of a control frame 310. In further preferred embodiments, the device 100 may not be a structural necessity of an air craft 300 having a movable control frame 310.

In some embodiments and as perhaps best shown by FIG. 1, the device 100 may include a cross bar 11 having a first end 12, a second end 13, a central region 14, a first central arm 15, and a second central arm 16. The first central arm 15 and the second central arm 16 may be coupled opposingly to the central region 14. The first end 12 may be formed by a portion of the first central arm 15 distal to the central region 14, and the second end 13 may be formed by a portion of the second central arm 16 distal to the central region 14. The first end 12 of the cross bar 11 may be configured to couple the cross bar 11 to the first upright 311 above the base tube 315, and the second end 13 of the cross bar 11 may be configured to couple the cross bar 11 to the second upright above the base tube 315 so that the crossbar 11 may be generally parallel to the base tube 315.

In some embodiments and as perhaps best shown by FIGS. 2-5, and 7, the device 100 may comprise a cross bar 11 having a first end 12 and a second end 13. A first handle bar 21 may be coupled to the first end 12 of the cross bar 11, and the first handle bar 21 may extend generally perpendicular to the cross bar 11. A second handle bar 22 may be coupled to the second end 13 of the cross bar 11, and the second handle bar 22 may extend generally perpendicular to the cross bar 11 in the same direction as the first handle bar 14 so that the first handle bar 21 and second handle bar 22 may be generally parallel to each other. A first upright fastener 41 may be coupled to the first handle bar 21, and the first upright fastener 41 may be configured to couple the first handle bar 21 to a first upright 311 of a hang glider 300 or ultra light aircraft. A second upright fastener 42 may be coupled to the second handle bar 22, and the second upright fastener 42 may be configured to couple the second handle bar 22 to a second upright 312 of the hang glider 300 or ultra light aircraft.

In some embodiments, the cross bar 11 may comprise a bar central region 14 with a first central arm 15 and a second central arm 16. The first central arm 15 and the second central arm 16 may each be coupled to the bar central region 14 so that the first central arm 15 and second central arm 16 may be coupled opposingly to the bar central region 14. The first end 12 of the cross bar 11 may be formed by a portion of the first central arm 15 distal to the central region 14, and the second end 13 of the cross bar 11 may be formed by a portion of the second central arm 16 distal to the central region 14. Optionally and as shown in the examples of FIGS. 1-4, the bar central region 14 may form the forward-most region of the cross bar 11, while the first central arm 15 and a second central arm 16 may couple the bar central region 14 to the first handle bar 21 and second handle bar 22, respectively. Preferably, the first central arm 15 and second central arm 16 may both be angled to extend the bar central region 14 out and away from both the first handle bar 21 and the second handle bar 22.

In preferred embodiments, the cross bar 11 may be coupled to the back/tail side of the uprights 311, 312, so that the cross bar 11 does not allow any input applied to the optional handle bars 21, 22, or optional handle bar extensions 23, 24, to twist or deform the uprights 311, 312, so as to result in damage to or structural failure of the air craft 300. In other embodiments, the cross bar 11 may be coupled to the central or middle side of the uprights 311, 312. In still other embodiments, the cross bar 11 may be coupled to the front/nose side of the uprights 311, 312.

The bar central region 14, first central arm 15, and second central arm 16 may be configured in any size, shape, and length. In some embodiments, the bar central region 14, first central arm 15, and second central arm 16 may each be generally linear in shape and coupled together so that the cross bar 11 is generally linear in shape. In alternative embodiments and as shown in FIGS. 1-5, the bar central region 14, first central arm 15, and second central arm 16 may each be generally linear in shape, and the first central arm 15 and second central arm 16 may each be angled relative to the bar central region 14. In further alternative embodiments, the bar central region 14, first central arm 15, and second central arm 16 may each be generally curved in shape and coupled together so that the cross bar 11 is generally curved in shape. In still further alternative embodiments, the bar central region 14, first central arm 15, and/or second central arm 16 may be generally curved in shape. Preferably, the bar central region 14, first central arm 15, and second central arm 16 may be shaped and coupled together so that the cross bar 11 may be symmetrical in shape from the center of the central region 14.

The first central arm 15 may form or comprise the first end 12 of the cross bar 11 and the second central arm 16 may form or comprise the second end 13 of the cross bar 11. In some embodiments, the first end 12 of the first central arm 15 and the second end 13 of the second central arm 16 may be coupled to a control frame 310 by being coupled directly to the uprights 311, 312, of the control frame 310. In further embodiments, the cross bar 11 may be coupled to the control frame 310 by being integrally formed with the control frame. In still further embodiments, the cross bar 11 may be removably coupled to the control frame 310 with one or more upright fasteners 41, 42, or any other removable fastening method. In still further embodiments, the cross bar 11 may be coupled to the control frame 310 with adhesives, heat bonding or welding, or any other generally non-removable fastening method.

In some embodiments, the first central arm 15 may be angled above the bar central region 14 so that all or portions of the first handle bar 21 may be disposed above the bar central region 14, and the second central arm 16 may be angled above the bar central region 14 so that all or portions of the second handle bar 22 may be disposed above the bar central region 14. In some embodiments, the first central arm 15 may be angled approximately 20 to 45 degrees above the bar central region 14, and the second central arm 16 may be angled approximately 20 to 45 degrees above the bar central region 14. In preferred embodiments, the first central arm 15 may be angled approximately 30 to 40 degrees above the bar central region 14, and the second central arm 16 may be angled approximately 30 to 40 degrees above the bar central region 14.

In some embodiments, and as shown in FIGS. 2-5, and 7, the device may comprise a first handle bar 21 and second handle bar 22 which may be coupled to the cross bar 11. Optionally, a first end 12 of the cross bar 11 may be configured to couple the cross bar 11 to the first upright 311 above the base tube 315 by having the first end 12 coupled to a first handle bar 21 and the first handle bar 21 may be coupled to the first upright 311. Likewise, a second end 13 of the cross bar 11 may be configured to couple the cross bar 11 to the second upright 312 above the base tube 315 by having the second end 13 coupled to a second handle bar 22 and the second handle bar 22 may be coupled to the second upright 312. In some embodiments, a first handle bar 21 may be coupled to the first end 12 of the cross bar 11, and the first handle bar 21 may extend generally perpendicular to the cross bar 11. A second handle bar 22 may be coupled to the second end 13 of the cross bar 11, and the second handle bar 22 may extend generally perpendicular to the cross bar 11 in the same direction as the first handle bar 21.

In further embodiments, the first handle bar 21 may be angled towards the first central arm 15, and the second handle bar 22 may be angled towards the second central arm 16 so that all or portions of the first handle bar 21 and second handle bar 22 may be generally parallel to each other. In some embodiments, the first handle bar 21 may be angled approximately 20 to 45 degrees towards the first central arm 15, and the second handle bar 22 may be angled approximately 20 to 45 degrees towards the second central arm 16. In preferred embodiments, the first handle bar 21 may be angled approximately 30 to 40 degrees towards the first central arm 15, and the second handle bar 22 may be angled approximately 30 to 40 degrees towards the second central arm 16. In alternative embodiments, the first handle bar 21 and second handle bar 22 may be generally curved in shape.

In preferred embodiments, a first handle bar 21 and a second handle bar 22 may be coupled to the cross bar 11 so that the first handle bar 21 and second handle bar 22 are generally parallel to each other. Generally parallel may be used to describe the first handle bar 21 and second handle bar 22 being angled between 0 degrees and 30 degrees towards each other or angled between 0 degrees and 30 degrees away from each other.

In some embodiments, the device 100 may comprise a first handle bar extension 23 which may be coupled to the first handle bar 21 opposingly to the first end 12 of the cross bar 11 so that the first central arm 15 and first handle bar extension 24 are coupled to opposite sides of the first handle bar 21. Similarly and in some embodiments, the device 100 may comprise a second handle bar extension 24 which may be coupled to the second handle 22 bar opposingly to second end 12 of the cross bar 11 so that the second central arm 16 and second handle bar extension 24 are coupled to opposite sides of the second handle bar 22.

In some embodiments, and as shown in FIGS. 1-4, and 6, the first handle bar extension 23 and second handle bar extension 24 may be generally linear in shape. In further embodiments, the first handle bar extension 23 may be angled below first handle bar 21, and the second handle bar extension 24 may be angled below the second handle bar 22. In some embodiments, the first handle bar extension 23 may be angled approximately 30 to 60 degrees below the first handle bar 21, and the second handle bar extension 24 may be angled approximately 30 to 60 degrees below the second handle bar 22. In preferred embodiments, the first handle bar extension 23 may be angled approximately 35 to 55 degrees towards the first handle bar 21, and the second handle bar extension 24 may be angled approximately 35 to 55 degrees towards the second handle bar 22. In alternative embodiments, the first handle bar extension 23 and second handle bar extension 24 may be generally curved in shape.

The cross bar 11, handle bars 21, 22, and handle bar extensions 23, 24, may be made of or comprise any suitable substantially rigid material. Example substantially rigid materials include steel alloys, aluminum, aluminum alloys, copper alloys, any other type of metal or metal alloy, various types of hard plastics, such as polyethylene (PE), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, and wood. In preferred embodiments, the cross bar 11, handle bars 21, 22, and handle bar extensions 23, 24, may be made of or comprise 6061-T6

Aluminum tubing of approximately 1.125 inch diameter and having approximately 0.065 to 0.095 wall thickness.

In some embodiments, the cross bar 11, handle bars 21, 22, and/or handle bar extensions 23, 24, may comprise a resilient cushioning material. Preferably, a resilient cushioning material may be wrapped around or otherwise surround all or portions of a cross bar 11, handle bars 21, 22, and/or handle bar extensions 23, 24. Examples of resilient cushioning materials include silicone rubber, silicone foams, rubber foams, urethane foams including plastic foams, neoprene foam, latex foam rubber, polyurethane foam rubber, elastomer materials such as elastic plastics, elastic silicone, elastic rubbers, or any other suitable elastomer or resilient material including combinations of materials. Preferably, one or more resilient cushioning materials may surround all or portions of a cross bar 11, handle bars 21, 22, and/or handle bar extensions 23, 24, thereby forming a cushion surface for the user to grip and also to cushion any impacts between the user and the device 100.

An exemplary method of constructing the cross bar 11, handle bars 21, 22, and handle bar extensions 23, 24, of a device 100 such as pictured in FIGS. 2-5 is now provided. In some embodiments, the cross bar 11, handle bars 21, 22, and handle bar extensions 23, 24, may be formed from metal tubing stock, such as 6061-T6 Aluminum tubing stock of approximately 1.125 inch diameter by 0.065 inch wall thickness. Preferably, the tubing stock may have a length of approximately 7 feet and 4 inches. The fabricating individual may mark top dead center on the length of tubing stock and place the stock in a tubing bender with appropriate 1.125 inch die. The following measurements, left and right, may be taken from the initial top dead center mark when the stock is in a linear or un-bent orientation. To bend a first side, such as the right hand side or first end 12 of the cross bar 11, measure approximately 9 inches from top dead center mark to initiate an approximately 35 degree bend (bend number one). Then rotate the stock approximately 35 degrees counter clockwise and proceed to a mark approximately 19.5 inches from dead center to initiate an approximately 35 degree bend (bend number two) to form first central arm 15 between the first and second bends. Next, rotate stock approximately 90 degrees counter clockwise and proceed to a mark 37 inches from dead center to initiate 45 degree bend (bend number three) to form the first handle bar 21 between the second and third bends with the stock distal to the third bend forming the first handle bar extension 23. To bend the second or left hand side use identical measurements but reverse the rotation direction so that the left hand side mirrors the right hand side resulting in the second end 13 of the cross bar 11, second handle bar 22, and second handle bar extension 24 generally mirroring the first end 12 of the cross bar 11, first handle bar 21, and first handle bar extension 23.

The device 100 may comprise one or more upright fasteners, such as a first upright fastener 41 and a second upright fastener 42. An upright fastener 41, 42, may be configured to couple the one or more elements of the device 100 to an upright 311, 312, of the control frame 310 of a hang glider 300. In some embodiments, an upright fastener 41, 42, may be configured to couple an end 12, 13, of a cross bar 11 to an upright 311, 312, of the control frame 310 of a hang glider 300. In other embodiments, an upright fastener 41, 42, may be configured to couple a handle bar 21, 22, to an upright 311, 312, of the control frame 310 of a hang glider 300.

In preferred embodiments, a first upright fastener 41 may be removably coupled to a first upright 311, and a second upright fastener 42 may be removably coupled to a second upright 312 of a control frame 310. In further embodiments, an upright fastener 41, 42, may comprise threaded type fasteners, clasp type fasteners, ratchet type fasteners, a push-to-lock type connection method, a turn-to-lock type connection method, a slide-to-lock type connection method or any other suitable temporary or removable connection method. In alternative embodiments, an upright fastener 41, 42, may comprise heat bonding, chemical bonding, adhesives, rivet type fasteners, or any other generally non-removable fastener or fastening method.

In further preferred embodiments, the device 100 may comprise a first upright fastener 41 which may be a clamp type fastener and a second upright fastener 42 which may also be a clamp type fastener. A clamp type fastener is a fastening device used to hold or secure objects tightly together to prevent movement or separation through the application of inward pressure to the objects. In some embodiments, an upright fastener 41, 42, configured as a clamp type fastener may include a clamp body 43, an inner clamp wing 44, an outer clamp wing 45, and one or more removable fasteners such as male removable fasteners 46 and female removable fasteners 47.

The clamp body 43 and inner clamp wing 44 may each comprise one or more lateral clamping surfaces 48 which may be shaped to contact and receive portions of the device 100 such as portions of a handle bar 21, 22. The clamp body 43 and outer clamp wing 45 may each comprise one or more longitudinal clamping surfaces 49 which may be shaped to contact and receive portions of an upright 311, 312, of the control frame 310 of a hang glider device 300. The clamp body 43, inner clamp wing 44, and outer clamp wing 45 may be made from or comprise any suitable substantially rigid material. One or more removable fasteners 46, 47, may be configured to removably couple portions of a handle bar 21, 22, to an upright 311, 312, by clamping a handle bar 21, 22, and an upright 311, 312, between the clamp body 43, inner clamp wing 44, and outer clamp wing 45. In some embodiments, the device 100 may comprise one or more male removable fasteners 46 and female removable fasteners 47 which may each comprise threading which may enable the removable fasteners 46, 47, to be threadedly coupled together. For example, a threaded male removable fastener 46 may comprise a threaded bolt and a threaded female removable fastener 47 may comprise a hand tighten-able nut. The male removable fastener 46 may extend through fastener apertures in the clamp body 43, inner clamp wing 44, outer clamp wing 45, optionally in a handle bar 21, 22, and/or optionally in an upright 311, 312, and a female removable fastener 47 may be coupled to the male removable fastener 46 to enable the upright fastener 41, 42, to removably couple and compress or clamp the handle bar 21, 22, to an upright 311, 312. As another example, the clamp body 43, inner clamp wing 44, outer clamp wing 45, optionally in a handle bar 21, 22, and/or optionally in an upright 311, 312, may comprise threading to which a male removable fastener 46 may be threadedly coupled to to enable the upright fastener 41, 42, to removably couple and compress or clamp the handle bar 21, 22, to an upright 311, 312.

In some embodiments, elements of the device 100, such as portions of a first handle bar 21, may be removably coupled to the first upright 311 of a control frame 310 of a hang glider device 300 by placing the clamp body 43 of a first upright fastener 41 between the first handle bar 21 and the first upright 311. The inner clamp wing 44 may be placed against the first handle bar 21 so that the lateral clamping surfaces 48 of both the inner clamp wing 44 and clamp body 43 are in contact with portions of the first handle bar 21. Likewise, the outer clamp wing 45 may be placed against the first upright 311 so that the longitudinal clamping surfaces 49 of both the outer clamp wing 45 and clamp body 43 are in contact with portions of the first upright 311. A threaded male removable fastener 46 may be inserted through or otherwise coupled to the clamp body 43, inner clamp wing 44, outer clamp wing 45, optionally the first handle bar 21, and/or optionally the first upright 311 and threadedly coupled to a female removable fastener 47 to enable the upright fastener 41, 42, to removably couple and compress or clamp the first handle bar 21 to the first upright 311. Similarly, elements of the device 100, such as portions of a second handle bar 22, may be removably coupled to the second upright 312 of a control frame 310 of a hang glider device 300 by placing the clamp body 43 of a second upright fastener 42 between the second handle bar 22 and the second upright 312. The inner clamp wing 44 may be placed against the second handle bar 22 so that the lateral clamping surfaces 48 of both the inner clamp wing 44 and clamp body 43 are in contact with portions of the second handle bar 22. Likewise, the outer clamp wing 45 may be placed against the second upright 312 so that the longitudinal clamping surfaces 49 of both the outer clamp wing 45 and clamp body 43 are in contact with portions of the second upright 312. A threaded male removable fastener 46 may be inserted through or otherwise coupled to the clamp body 43, inner clamp wing 44, outer clamp wing 45, optionally the second handle bar 22, and/or optionally the second upright 312 and threadedly coupled to a female removable fastener 47 to enable the upright fastener 41, 42, to removably couple and compress or clamp the second handle bar 22 to the second upright 312.

An exemplary method of constructing a clamp type upright fastener 41, 42, such as pictured in FIGS. 2-7 is now provided. In some embodiments, a clamp type upright fastener 41, 42, may comprise a clamp body 43, inner clamp wing 44, and outer clamp wing 45 may each be formed from a block of substantially rigid material such as Ultra-high-molecular-weight polyethylene (UHMWPE, UHMW). Optionally, the clamp body 43 and outer clamp wing 45 may each be cut 1 inch by 3 inches by 4.5 inches and the inner clamp wing 44 may be cut 1 inch by 1.5 inches by 4.5 inches. The profile of a handle bar 21, 22, may be machined between the clamp body 43 and inner clamp wing 44 as lateral clamping surfaces 48 dead center along their 3 inch widths to gently wrap around the handle bar 21, 22. A half profile of an upright 311, 312, may be machined along the length of the clamp body 43 on the opposite side as the half profile for the handle bar 21, 22. A half profile of the upright 311, 312, may also be machined along the length of one side of outer clamp wing 45. The handle bar 21, 22, may be placed between the clamp body 43 and inner clamp wing 44, and the upright 311, 312, may be placed between the outer clamp wing 45 and the clamp body 43. A threaded male removable fastener 46 may be inserted through or otherwise coupled to the clamp body 43, inner clamp wing 44, outer clamp wing 45, optionally the second handle bar 22, and/or optionally the second upright 312 and threadedly coupled to a female removable fastener 47 to enable the upright fastener 41, 42, to removably couple and compress or clamp the second handle bar 22 to the second upright 312.

Figure 7:
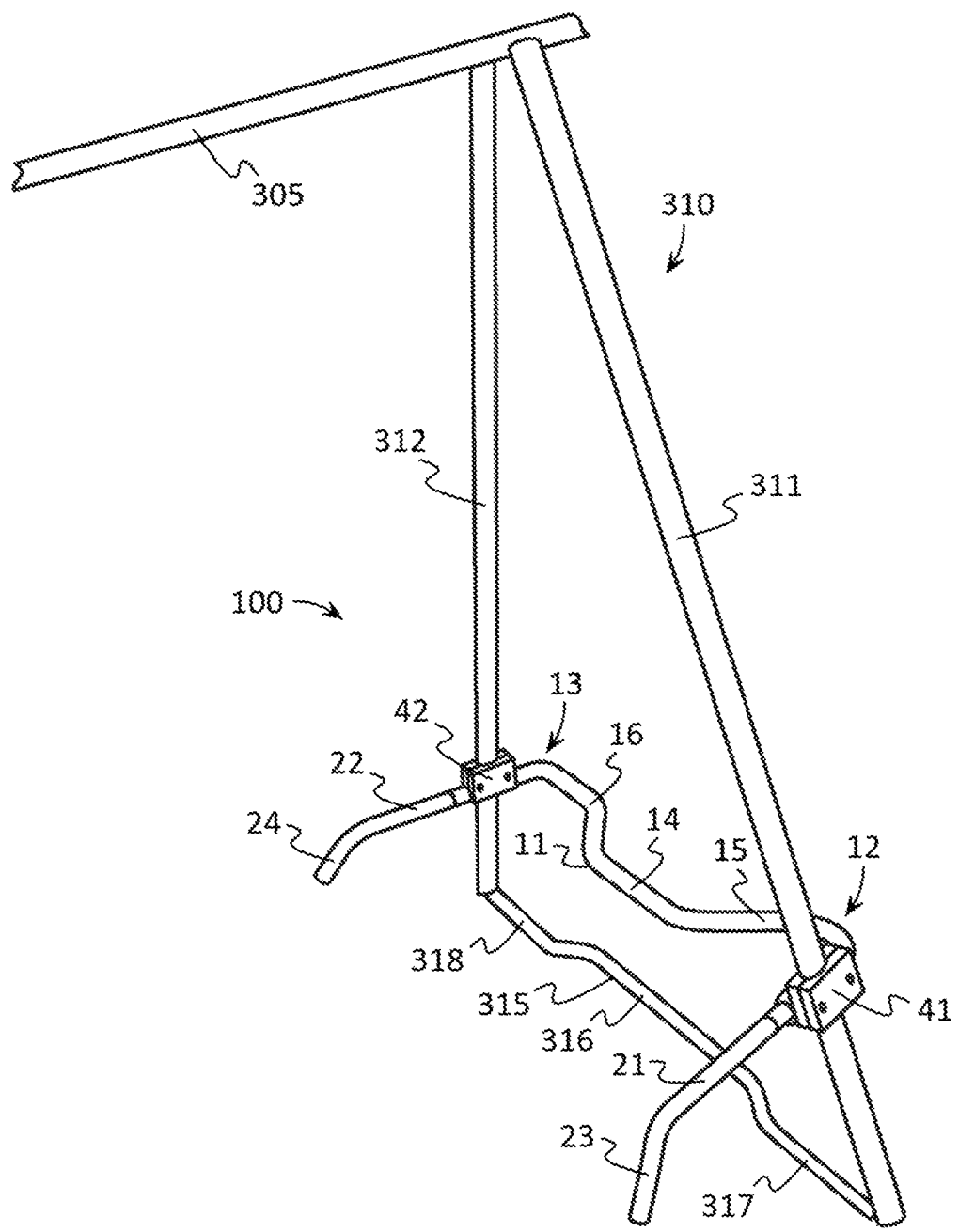
FIG. 7 depicts a perspective view of an alternative example of a hang glider control device coupled to an A-frame or triangular control frame of an ultra light aircraft according to various embodiments described herein.

An alternative example of a device 100 is shown in FIG. 7. In some embodiments, the bar central region 14 of the cross bar 11 may form the rear-most region of the cross bar 11, while the first central arm 15 and second central arm 16 may form the forward-most region of the cross bar 11 and also couple the bar central region 14 to the first handle bar 21 and second handle bar 22, respectively. Preferably, the portions of the bar central region 14, first central arm 15, and/or second central arm 16 may both be angled to extend the bar central region 14 in and towards both the first handle bar 21 and the second handle bar 22. By having the bar central region 14 extend in and towards both the first handle bar 21 and the second handle bar 22, the device 100 may be particularly useful to pilots who cannot use their legs, such as pilots with a physical disability (paraplegic) or injury.

Figure 6:
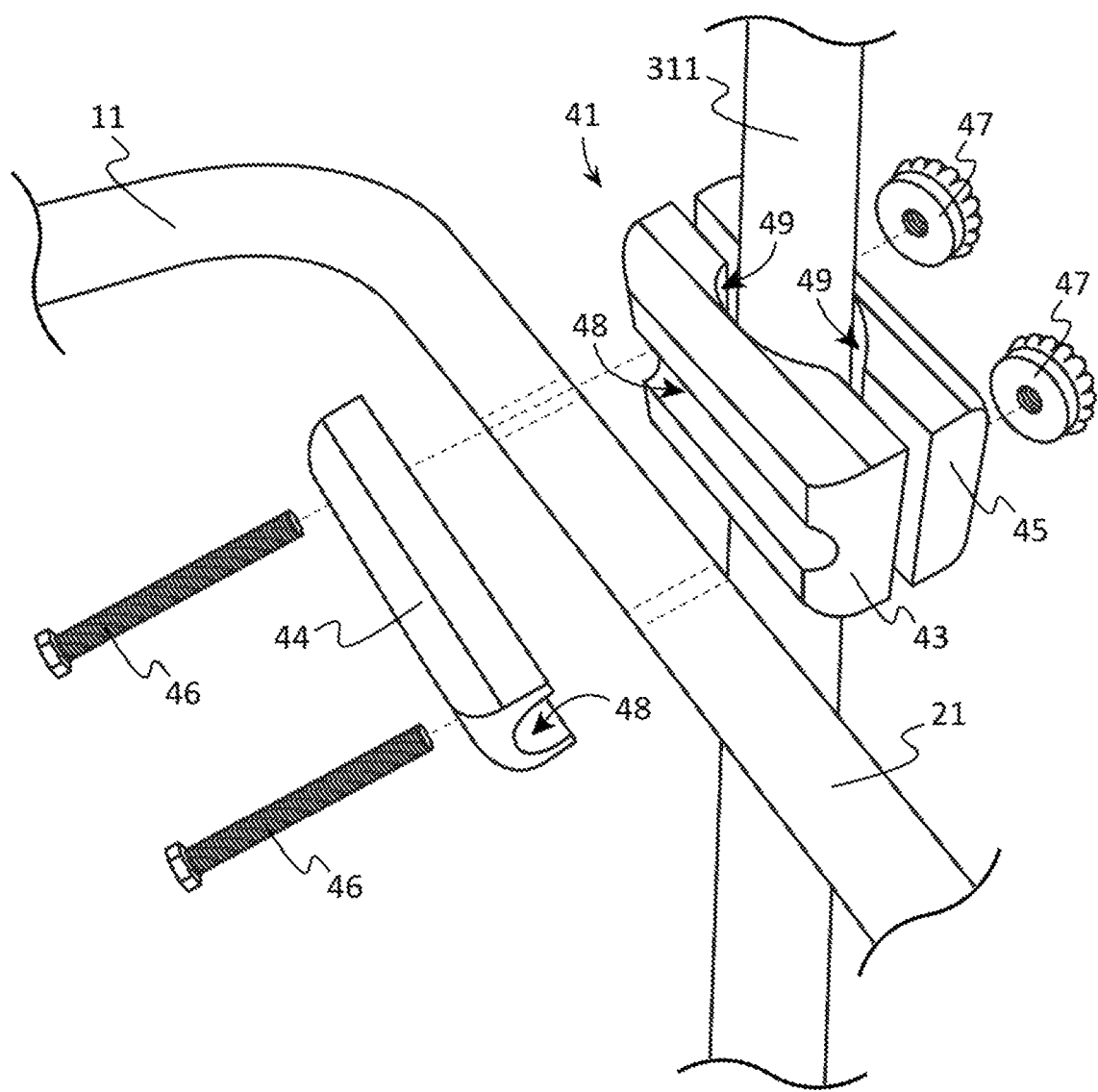
FIG. 6 shows a perspective view of an example of an upright fastener according to various embodiments described herein.

An exemplary method of constructing the cross bar 11, handle bars 21, 22, and handle bar extensions 23, 24, of a device 100 such as pictured in FIG. 6 is now provided. In some embodiments, the cross bar 11, handle bars 21, 22, and handle bar extensions 23, 24, may be formed from metal tubing stock, such as 6061-T6 Aluminum tubing stock of approximately 1.125 inch diameter by 0.095 inch wall thickness. Preferably, the tubing stock may have a length of approximately 8 feet. The fabricating individual may mark top dead center on the length of tubing stock and place the stock in a tubing bender with appropriate 1.125 inch die. The following measurements, left and right, may be taken from the initial top dead center mark when the stock is in a linear or un-bent orientation. References are given from the viewpoint of an observer or craftsman positioned near the nose of the aircraft looking back towards item #1 properly mounted on the aircraft. Directions are given for the construction of the left side or second side of the device 100 and then mirrored to construct the right side or first side so that both sides are symmetrical. Measuring 4.25 inches from the top dead center mark on the tube a 4 inch radius forward bend is begun until the angle reaches 40 degrees. This is bend number 1 on the inward facing bar central region 14. Continue straight from beyond the point bend number 1 ends for 5.50 inches and initiate a second 4 inch radius bend towards the left through 45 degrees rotated upward 15 degrees before Bend number 2 is initiated. This is bend number 2. Continue straight for 3 more inches before initiating a rearward bend 4 inch radius bend through 60 degrees and in the same line as bend number 2. This action concludes bend number three forming the forward facing portion of the second central arm 16 between the second and third bend. Continue straight along the tube 15 inches to initiate a 4 inch radius downward 45-degree bend rotated to the left, or outward, 30 degrees before bend is initiated. This is bend number 4 so that the second handle bar 22 is formed between bend number three and four and the second handle bar extension 24 is formed distally after the fourth bend. Continue straight along tube for 3.5 inches and cut tube to terminate the second handle bar extension 24. To bend the first or right hand side use identical measurements but reverse the rotation direction so that the left hand side mirrors the right hand side resulting in the second end 13 of the cross bar 11, second handle bar 22, and second handle bar extension 24 generally mirroring the first end 12 of the cross bar 11, first handle bar 21, and first handle bar extension 23.

Now turning to FIGS. 2-4, and 6, in some embodiments a hang glider control device 100 may comprise a control frame 310 having a first upright 311, a second upright 312, and a base tube 315 which may be coupled in a generally triangular orientation. The device 100 may further include a cross bar 11 having a first end 12 and a second end 13. A first handle bar 21 may be coupled to the first end 12 of the cross bar 11, and the first handle bar 21 may extend generally perpendicular to the cross bar 11. A second handle bar 22 may be coupled to the second end 13 of the cross bar 11, and the second handle bar 22 may also extend generally perpendicular to the cross bar 11 in the same direction as the first handle bar 21 so that the first handle bar and second handle bar are generally parallel to each other. A first upright fastener 41 may couple the first handle bar 21 to the first upright 311, and a second upright fastener 42 may couple the second handle bar 22 to the second upright 312.

In some embodiments, a base tube 315 may form the lower portion of a generally triangular control frame 310 with each end of the base tube 315 attached to an upright 311, 312, where both uprights 311, 312, extend and are connected to the main body of the glider 300. A base tube 315 may be made from tubular bar stock of aluminum or other alloy or formed with any other substantially rigid material. Likewise, an upright 311, 312, may be made from tubular bar stock of aluminum or other alloy or formed with any other substantially rigid material.

In some embodiments, the base tube 315 may comprise a tube central region 316, a first tube distal region 317, and a second tube distal region 318. The first tube distal region 317 and second tube distal region 318 may be coupled opposingly to the tube central region 316. Preferably, the first tube distal region 317 may be coupled to the first upright 311 and the second tube distal region 318 may be coupled to the second upright 312. In some embodiments, the first tube distal region 317 and second tube distal region 318 may both be angled to extend the central tube region 316 out and away from the cross bar 11. In alternative embodiments, the base tube 315 may be generally linear in shape so that the tube central region 316, first tube distal region 317, and second tube distal region 318 are oriented generally linear to each other.

In some embodiments, the device 100 may further comprise a first wheeled conveyance 61 coupled to the control frame 310 proximate to a junction between the first upright 311 and the base tube 315 and a second wheeled conveyance 62 may be coupled to the control frame 310 proximate to a junction between the second upright 312 and the base tube 315. Preferably, a wheeled conveyance 61, 62, may comprise a tire or other flexible coating to enable the wheeled conveyance 61, 62, to roll easily across various ground surfaces.

Figure 8:
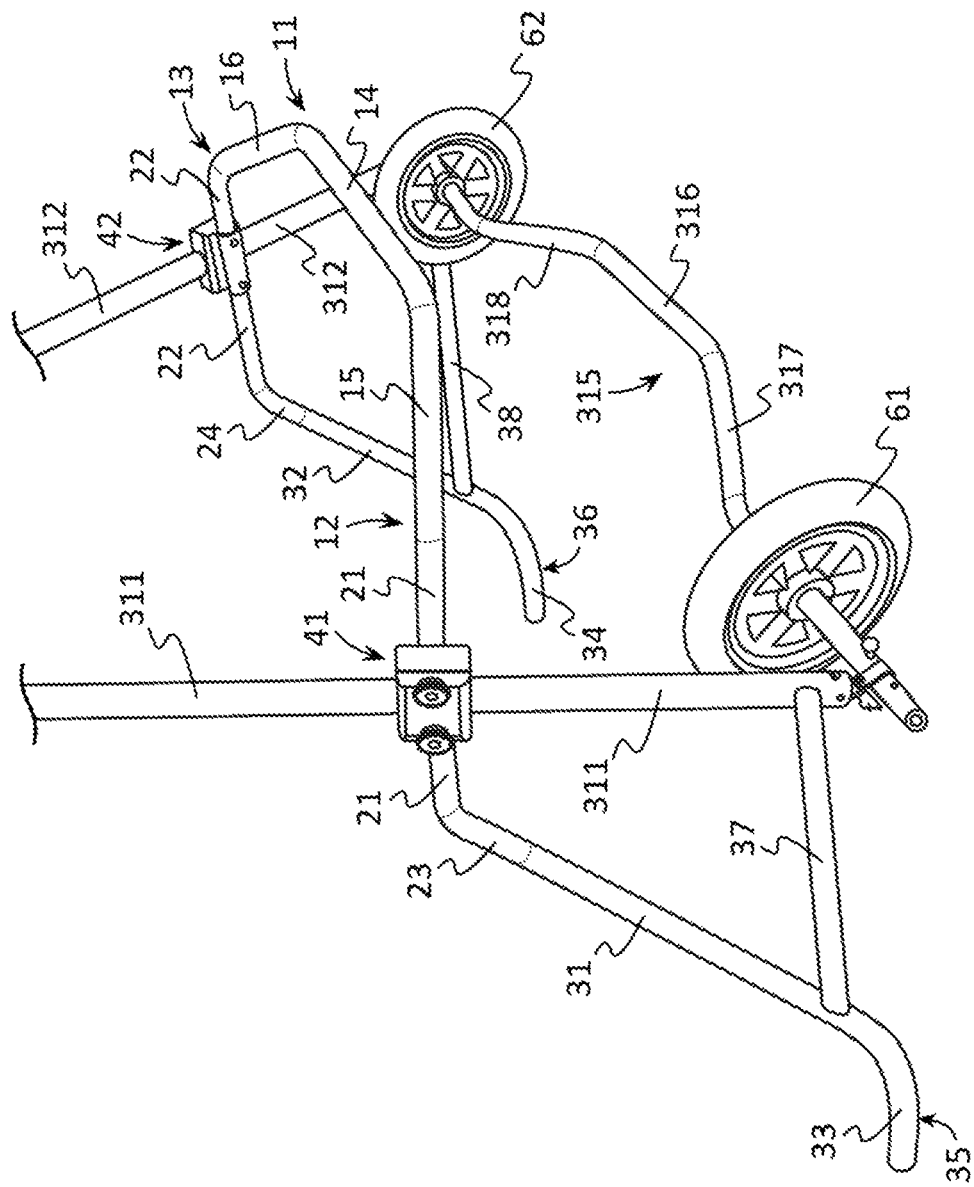
FIG. 8 illustrates a perspective view of a further example of a hang glider control device coupled to an A-frame or triangular control frame of an ultra light aircraft according to various embodiments described herein.

FIG. 8 illustrates a perspective view of a further example of a hang glider control device 100 coupled to an A-frame or triangular control frame 310 of an ultra light aircraft or hang glider 300 (FIG. 5) according to various embodiments described herein. In some embodiments, the device 100 may comprise a first extension support 31 and a second extension support 32. A first extension support 31 may be integrally formed with or otherwise coupled to a first handle bar extension 23, and a second extension support 32 may be integrally formed with or otherwise coupled to a second handle bar extension 24. In alternative embodiments, a first extension support 31 may be integrally formed with or otherwise coupled to a first central arm 15, and a second extension support 32 may be integrally formed with or otherwise coupled to a second central arm 16. In further alternative embodiments, a first extension support 31 may be integrally formed with or otherwise coupled to a first handle bar 21, and a second extension support 32 may be integrally formed with or otherwise coupled to a second handle bar 22.

In some embodiments, the first extension support 31 may be angled approximately 30 to 60 degrees below the cross bar 11, and the second extension support 32 may be angled approximately 30 to 60 degrees below the cross bar 11. In preferred embodiments, the first extension support 31 may be angled approximately 35 to 55 degrees towards the first upright 311, and the second extension support 32 may be angled approximately 35 to 55 degrees towards the second upright 312.

Optionally, a first extension support 31 may be integrally formed with or otherwise coupled to a first ground conveyance 33, having a first skid surface 35, which may be located distally to the first handle bar extension 23, and a second extension support 32 may be integrally formed with or otherwise coupled to a second ground conveyance 34, having a second skid surface 36, which may be located distally to the second handle bar extension 24. The ground conveyances 33, 34, may be configured to contact a ground surface, such as when the hang glider 300 having the device 100 is resting on a surface, landing, and/or taking off. In some embodiments, a ground conveyance 33, 34, may comprise a ski, skid, pontoon, or other non-rotating ground contacting conveyance having a skid surface 35, 36, as shown in FIG. 8. In alternative embodiments, a ground conveyance 33, 34, may comprise a wheel, track, or the like having one or more rotatable or movable surfaces.

In some embodiments, the device 100 may comprise a first upright support 37 and a second upright support 38. A first upright support 37 may be coupled to the bottom portions of a first upright 311 and/or to a first tube distal region 317 of a base tube 315. Likewise, a second upright support 37 may be coupled to the bottom portions of a second upright 312 and/or to a second tube distal region 318 of a base tube 315. Optionally, a first upright support 37 may be integrally formed with or otherwise coupled to a first ground conveyance 33, having a first skid surface 35, which may be located distally to the first upright 311 and/or base tube 315, and a second upright support 38 may be integrally formed with or otherwise coupled to a second ground conveyance 34, having a second skid surface 36, which may be located distally to the second upright 312 and/or base tube 315. In preferred embodiments, a first extension support 31 may be coupled to a first upright support 37 and a first ground conveyance 33 may be coupled to the first extension support 31 and/or to the first upright support 37 proximate to the junction of the first extension support 31 and the first upright support 37. Similarly, a second extension support 32 may be coupled to a second upright support 38 and a second ground conveyance 34 may be coupled to the second extension support 32 and/or to the second upright support 38 proximate to the junction of the second extension support 32 and the second upright support 38. A first extension support 31, second extension support 32, first ground conveyance 33, second ground conveyance 34, first skid surface 35, second skid surface 36, first upright support 37, and second upright support 38 may be made from substantially rigid material such as those which may be used to form the cross bar 11.

While some materials have been provided, in other embodiments, the elements that comprise the device 100 such as the cross bar 11, optional handle bars 21, 22, optional upright fasteners 41, 42, optional handle bar extensions 23, 24, optional uprights 311, 312, optional base tube 315, optional wheeled conveyances 61, 62 and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A hang glider control device for use with a hang glider having a control frame which includes a first upright and a second upright, the device comprising:
   a. a cross bar having a first end and a second end;
   b. a first handle bar coupled to the first end of the cross bar, the first handle bar extending generally perpendicular to the cross bar;
   c. a second handle bar coupled to the second end of the cross bar, wherein the second handle bar extends generally perpendicular to the cross bar in the same direction as the first handle bar, and wherein the first handle bar and second handle bar are generally parallel to each other;
   d. a first upright fastener for coupling the first handle bar to the first upright; and
   e. a second upright fastener for coupling the second handle bar to the second upright.

2. The device of claim 1, wherein the first upright fastener is removably coupled to the first upright, and wherein the second upright fastener is removably coupled to the second upright.

3. The device of claim 1, wherein the first upright fastener is a clamp type fastener, and wherein the second upright fastener is a clamp type fastener.

4. The device of claim 1, wherein the cross bar comprises a central region with a first central arm and a second central arm coupled opposingly to the central region, wherein the first central arm is coupled to the first handle bar and the second central arm is coupled to the second handle bar, and wherein the first central arm and second central arm are both angled to extend the central region out and away from both the first handle bar and the second handle bar.

5. The device of claim 1, wherein the first central arm is angled above the central region, and wherein the second central arm is angled above the central region.

6. The device of claim 1, further comprising a resilient cushioning material.

7. The device of claim 1, wherein the cross bar comprises a central region with a first central arm and a second central arm coupled opposingly to the central region, wherein the first central arm is coupled to the first handle bar and the second central arm is coupled to the second handle bar, and wherein the first central arm and second central arm are both angled to extend the central region in and towards both the first handle bar and the second handle bar.

8. The device of claim 1, further comprising a first handle bar extension coupled to the first handle bar opposingly to the cross bar, and further comprising a second handle bar extension coupled to the second handle bar opposingly to the cross bar.

9. The device of claim 8, wherein the first handle bar extension is angled below the first handle bar, and wherein the second handle bar extension is angled below the second handle bar.

10. A hang glider control device for use with a hang glider, the device comprising:
    a. a control frame, the control frame comprising a first upright, second upright, and base tube coupled in a triangular orientation, and the triangular control frame comprising a hang glider control device;
    b. a cross bar having a first end and a second end;
    c. a first handle bar coupled to the first end of the cross bar, the first handle bar extending generally perpendicular to the cross bar;
    d. a second handle bar coupled to the second end of the cross bar, wherein the second handle bar extends generally perpendicular to the cross bar in the same direction as the first handle bar, and wherein the first handle bar and second handle bar are generally parallel to each other;
    e. a first upright fastener coupling the first handle bar to the first upright; and
    f. a second upright fastener coupling the second handle bar to the second upright.

11. The device of claim 10, wherein the first upright fastener is removably coupled to the first upright, and wherein the second upright fastener is removably coupled to the second upright.

12. The device of claim 10, wherein the first upright fastener comprises a clamp, and wherein the second upright fastener comprises a clamp.

13. The device of claim 10, wherein the cross bar comprises a bar central region with a first central arm and a second central arm coupled opposingly to the bar central region, wherein the first central arm is coupled to the first handle bar and the second central arm is coupled to the second handle bar, and wherein the first central arm and second central arm are both angled to extend the bar central region out and away from both the first handle bar and the second handle bar.

14. The device of claim 10, wherein the first central arm is angled above the central region, and wherein the second central arm is angled above the central region.

15. The device of claim 10, further comprising a resilient cushioning material.

16. The device of claim 10, wherein the cross bar comprises a central region with a first central arm and a second central arm coupled opposingly to the central region, wherein the first central arm is coupled to the first handle bar and the second central arm is coupled to the second handle bar, and wherein the first central arm and second central arm are both angled to extend the central region in and towards both the first handle bar and the second handle bar.

17. The device of claim 10, further comprising a first handle bar extension coupled to the first handle bar opposingly to the cross bar, and further comprising a second handle bar extension coupled to the second handle bar opposingly to the cross bar.

18. The device of claim 17, wherein the first handle bar extension is angled below the first handle bar, and wherein the second handle bar extension is angled below the second handle bar.

19. The triangular control frame of claim 10, further comprising a first wheeled conveyance coupled to the control frame proximate to a junction between the first upright and the base tube, and further comprising a second wheeled conveyance coupled to the control frame proximate to a junction between the second upright and the base tube.

20. The device of claim 10, wherein the base tube comprises a tube central region with a first tube distal region and a second tube distal region opposingly to the tube central region, wherein the first tube distal region is coupled to the first upright and the second tube distal region is coupled to the second upright, and wherein the first tube distal region and second tube distal region are both angled to extend the central tube region out and away from the cross bar.

\* \* \* \* \*